(12) United States Patent
McNamara et al.

(10) Patent No.: US 11,365,874 B2
(45) Date of Patent: Jun. 21, 2022

(54) WREATH DECORATION SYSTEM

(71) Applicants: Richard J. McNamara, Tampa, FL (US); Judith M. Smith, High Ridge, MO (US)

(72) Inventors: Richard J. McNamara, Tampa, FL (US); Judith M. Smith, High Ridge, MO (US)

( * ) Notice: Subject to any disclaimer, the term of this patent is extended or adjusted under 35 U.S.C. 154(b) by 0 days.

(21) Appl. No.: 17/496,640

(22) Filed: Oct. 7, 2021

(65) Prior Publication Data
US 2022/0026051 A1 Jan. 27, 2022

Related U.S. Application Data

(63) Continuation of application No. 17/148,459, filed on Jan. 13, 2021, now Pat. No. 11,156,345, which is a continuation-in-part of application No. 29/721,708, filed on Jan. 22, 2020.

(60) Provisional application No. 62/960,570, filed on Jan. 13, 2020.

(51) Int. Cl.
*F21V 21/16* (2006.01)
*F21V 23/00* (2015.01)
*F21V 23/04* (2006.01)
*F21S 4/10* (2016.01)
*F21V 23/06* (2006.01)

(52) U.S. Cl.
CPC ............... *F21V 21/16* (2013.01); *F21S 4/10* (2016.01); *F21V 23/003* (2013.01); *F21V 23/0435* (2013.01); *F21V 23/06* (2013.01)

(58) Field of Classification Search
CPC .... F21V 21/16; F21V 23/003; F21V 23/0435; F21V 23/06; F21S 4/10

USPC ......................................................... 362/122
See application file for complete search history.

(56) References Cited

U.S. PATENT DOCUMENTS

| | | | |
|---|---|---|---|
| 1,853,305 A | 4/1932 | Frei | |
| 2,033,173 A | 3/1936 | Barocas | |
| 5,109,324 A * | 4/1992 | Ahroni | F21S 4/10 362/249.14 |
| 5,150,964 A * | 9/1992 | Tsui | F21S 4/10 362/653 |
| 5,554,420 A | 9/1996 | Noble | |
| 5,789,043 A | 8/1998 | Law | |

(Continued)

FOREIGN PATENT DOCUMENTS

EP 3251870 B1 7/2019

*Primary Examiner* — Bryon T Gyllstrom

(57) ABSTRACT

A wreath decoration system is used to enable users to mount a decorative acrylic plate to a wreath to enhance the decoration of the wreath. The system includes a first wire fastener, a second wire fastener, a support beam, a primary illumination source, a microcontroller, and a power supply system. The first wire fastener and the second wire fastener help secure the support beam to the wreath. The first wire fastener and the second wire fastener also help position the support beam behind the wreath so that the support beam is hidden behind the wreath leaves. The support beam centers the primary illumination source on the wreath. The primary illumination source illuminates any decoration positioned on the center of the wreath. The microcontroller enables the configuration of the settings of the primary illumination source. The power supply system supplies the voltage necessary to the primary illumination source and the microcontroller.

10 Claims, 8 Drawing Sheets

(56) References Cited

U.S. PATENT DOCUMENTS

| | | | | |
|---|---|---|---|---|
| 5,834,901 A | * | 11/1998 | Shen | H05B 39/09 |
| | | | | 315/185 S |
| 7,494,244 B1 | * | 2/2009 | Van Diep | F21V 19/001 |
| | | | | 439/502 |
| 8,234,804 B1 | | 8/2012 | Rush | |
| 2003/0071581 A1 | * | 4/2003 | Panagotacos | G09F 13/22 |
| | | | | 315/185 R |
| 2006/0090384 A1 | | 5/2006 | Woodruff | |
| 2008/0169910 A1 | * | 7/2008 | Greene | H02J 50/70 |
| | | | | 340/10.34 |
| 2009/0147509 A1 | * | 6/2009 | Reed | F21V 21/002 |
| | | | | 362/418 |
| 2009/0317568 A1 | | 12/2009 | Hruska | |
| 2013/0135870 A1 | * | 5/2013 | Yokosawa | F21S 8/06 |
| | | | | 362/253 |
| 2013/0201658 A1 | * | 8/2013 | Bogart | F21V 15/00 |
| | | | | 362/95 |
| 2018/0299084 A1 | * | 10/2018 | Chien | F21V 13/02 |
| 2019/0057627 A1 | | 2/2019 | Mullett | |
| 2020/0032986 A1 | * | 1/2020 | Zhang | F21V 23/001 |
| 2020/0128758 A1 | | 4/2020 | Pestl | |
| 2021/0215328 A1 | | 7/2021 | McNamara | |

\* cited by examiner

WREATH DECORATION SYSTEM

The current application is a continuation application of the U.S. non-provisional application Ser. No. 17/148,459 filed on Jan. 13, 2021. The U.S. non-provisional application Ser. No. 17/148,459 claims a priority to the U.S. Provisional Patent application Ser. No. 62/960,570 filed on Jan. 13, 2020.

The current application is also a continuation-in-part (CIP) application of the U.S. design application Ser. No. 29/721,708 filed on Jan. 22, 2020.

FIELD OF THE INVENTION

The present invention generally relates to decoration mounts and wreath accessories. More specifically, the present invention provides an illumination system for etched acrylic plate decorations for wreaths.

BACKGROUND OF THE INVENTION

Light decorations are an essential part of home decorations for the holidays. Light decorations come in various types, shapes, and sizes. For example, some of the most common holiday light decorations are Christmas lights that are often attached to Christmas trees, walls, handrails, etc. Often these lights decorations are combined with other holiday decorations to enhance the overall design, such as covering nativity scenes with lights or adding string lights to wreaths. However, light decorations do not usually provide means to secure light decorations to the other decorations, making users to come up with ways to fasten the whole assembly together. For example, users utilize fasteners such as zip ties or clips to secure the light ornaments to the desired object. Unfortunately, these fasteners often fail to properly position the light ornaments on the desired object, such as centering a light decoration on a wreath.

An objective of the present invention is to provide an apparatus for mounting an illumination source on a decorative wreath for displaying an ornamental engraved/etched acrylic plate. The apparatus can be secured to the frame of the wreath so only the acrylic plate can be seen in the center of the wreath, with the rest of the apparatus being hidden by the branches or other materials of the wreath. The apparatus can be mounted at any orientation or position on the wreath. Another objective of the present invention is to provide a system which enables the user to connect one or more light ornaments to the apparatus. The system enables the user to control each ornamental light independently so that the user can configure each light setting. Additional features and benefits are further discussed in the sections below.

SUMMARY OF THE INVENTION

The present invention is a wreath decoration system that enables the user to mount an engraved/etched acrylic plate to enhance the ornamental design of the wreath. The acrylic plate can be custom made to have any shape, size, or design that the users desire. The present invention provides a support beam to facilitate the mounting of the illumination source onto the wreath. The support beam is an adjustable rigid structure that lifts the illuminating source just below the branches in the center of the wreath, allowing the illuminating source to be concealed with only the acrylic plate being left visible from the front of the wreath. A pair of wire fasteners on both ends of the support beam help the user secure the illumination source to the wire frame of the wreath and positions the apparatus forward and centered on the wreath.

The system of the present invention enables users to selectively control the voltage source and control signals for the light decorations. A microcontroller is also provided to help the users to configure the different variables of operation of the light decorations such as each light intensity, color change, programmable lighting function, and display routines. Furthermore, the control of the illumination source and the connected light decorations can be done directly or remotely through an external computing device that is communicably coupled to the microcontroller. Thus, the users can configure the operation of the apparatus from anywhere.

DETAILED DESCRIPTION OF THE INVENTION

All illustrations of the drawings are for the purpose of describing selected versions of the present invention and are not intended to limit the scope of the present invention.

Figure 1:
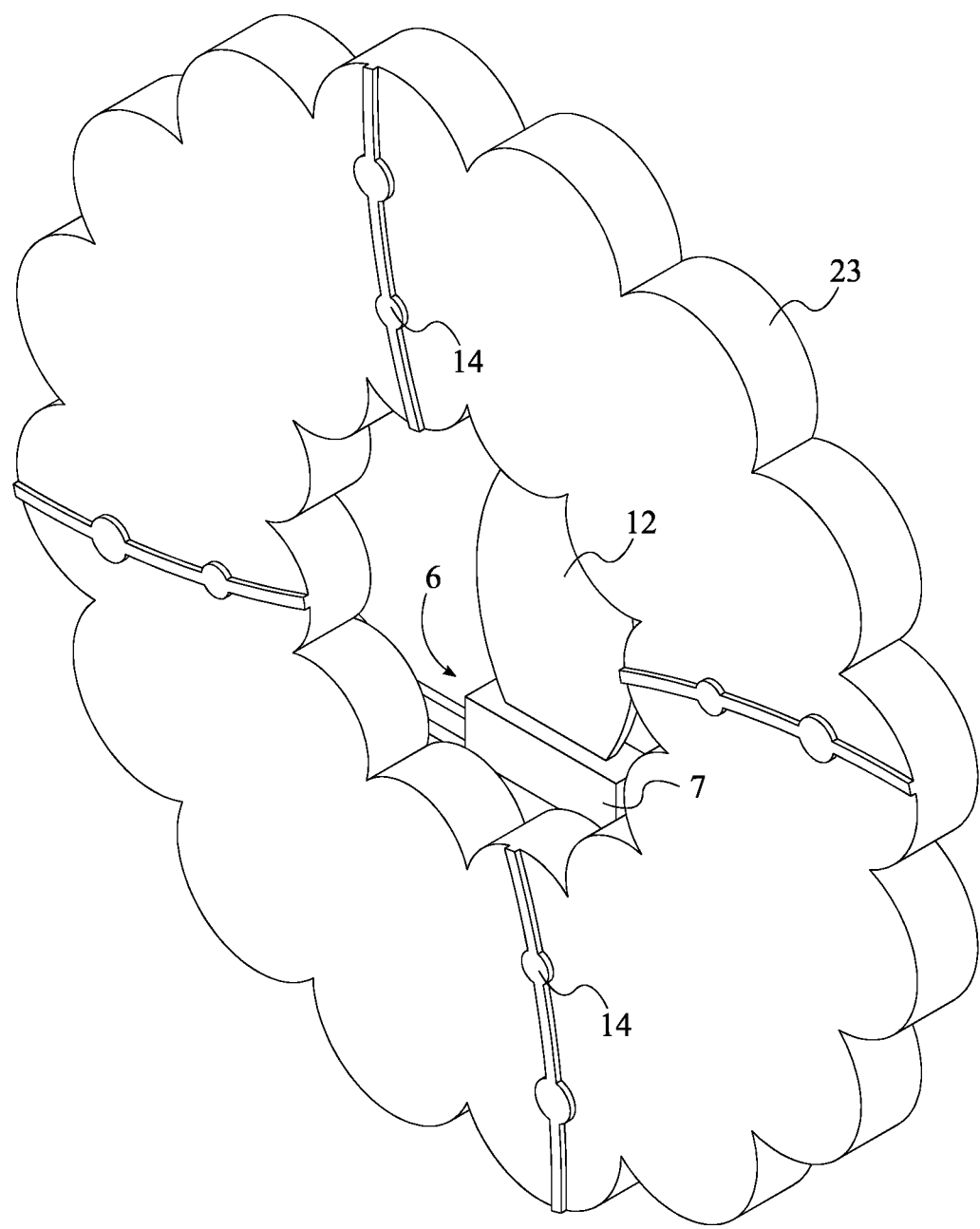
FIG. 1 is a top perspective view showing the present invention mounted onto a wreath.
Figure 2:
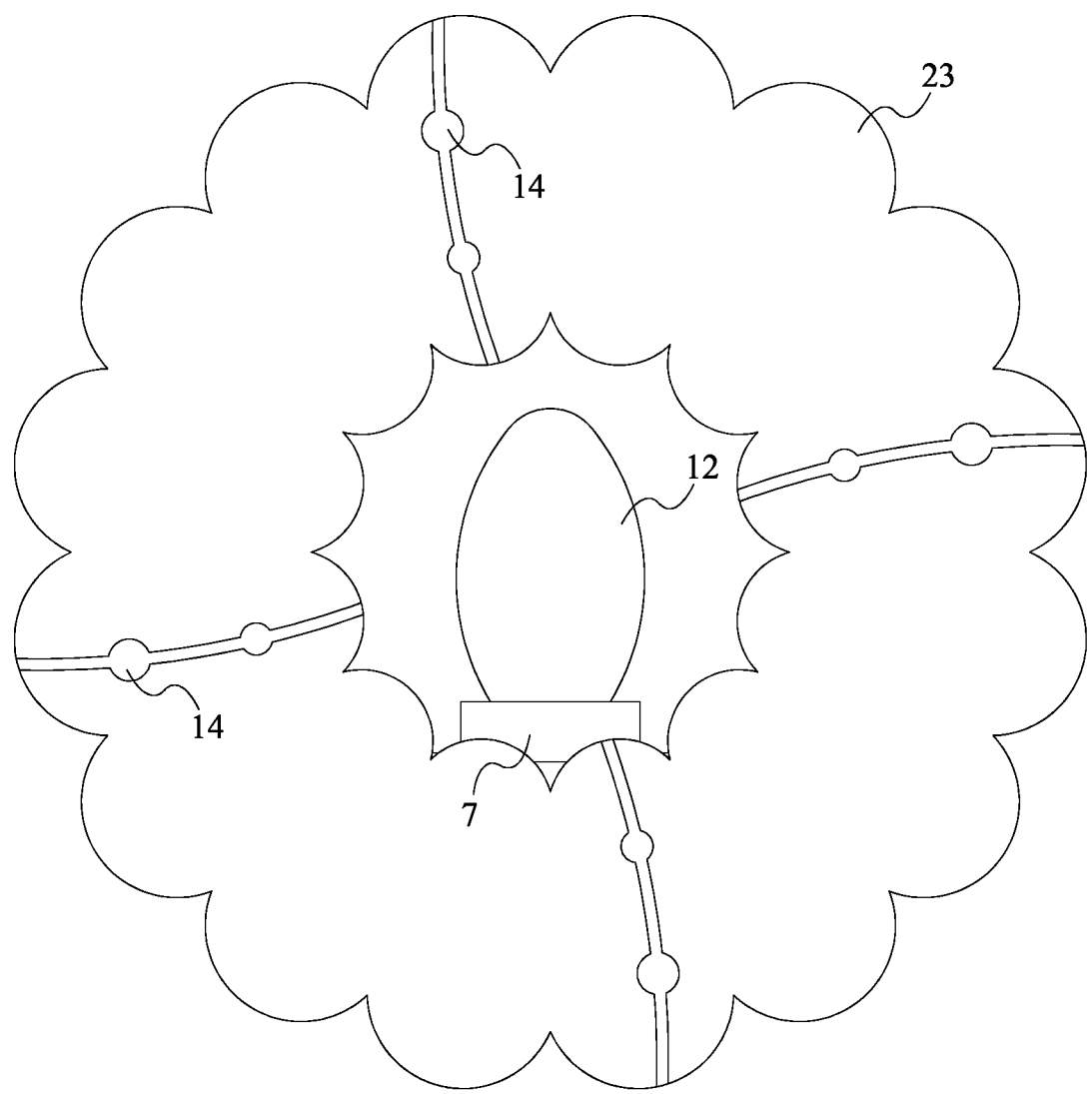
FIG. 2 is a front view showing the etched transparent plate being centered on the wreath by the support beam, wherein the support beam is being hidden by the wreath.
Figure 3:
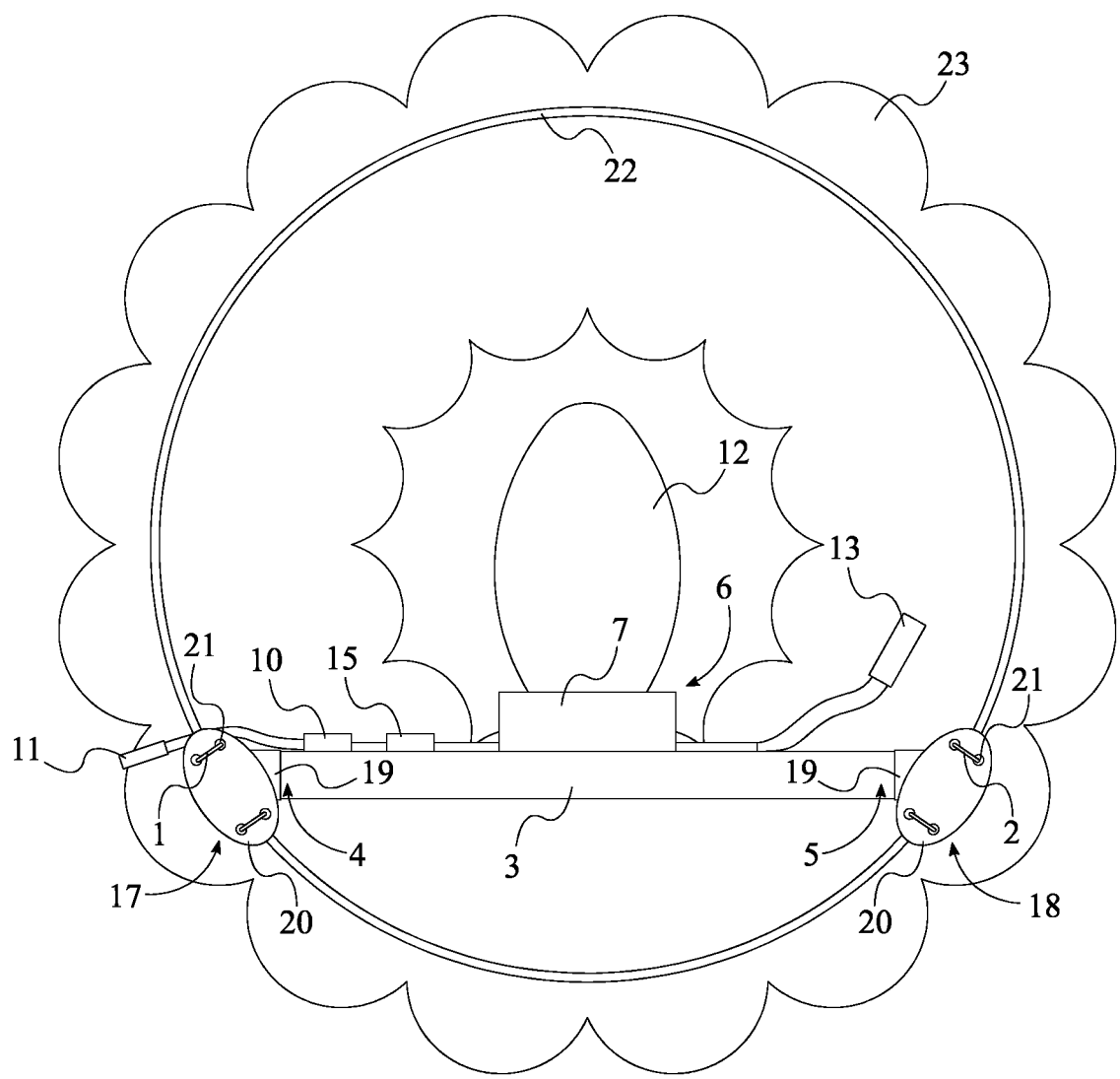
FIG. 3 is a rear view showing the support beam fastened to the wire frame of the wreath by the first wire fastener and the second wire fastener.

The present invention is a wreath decoration system that enables users to mount a decorative acrylic plate to a wreath decoration to enhance the decoration. As can be seen in FIG. 1 through 3, the present invention may comprise a first wire fastener 1, a second wire fastener 2, a support beam 3, a primary illumination source 6, a microcontroller 10, and a power supply system 11. The first wire fastener 1 and the second wire fastener 2 help secure the support beam 3 to the wire frame 22 of the wreath 23. The first wire fastener 1 and the second wire fastener 2 also help offset the support beam 3 from the wire frame 22 to hide the support beam 3 behind the wreath 23. The support beam 3 helps center the primary illumination source 6 on the bottom of the wreath 23. The primary illumination source 6 illuminates any decoration positioned on the center of the wreath 23. The microcontroller 10 enables the configuration of the settings for the operation of the primary illumination source 6. Finally, the power supply system 11 supplies the power required for the operation of the primary illumination source 6 and the microcontroller 10.

Figure 6:
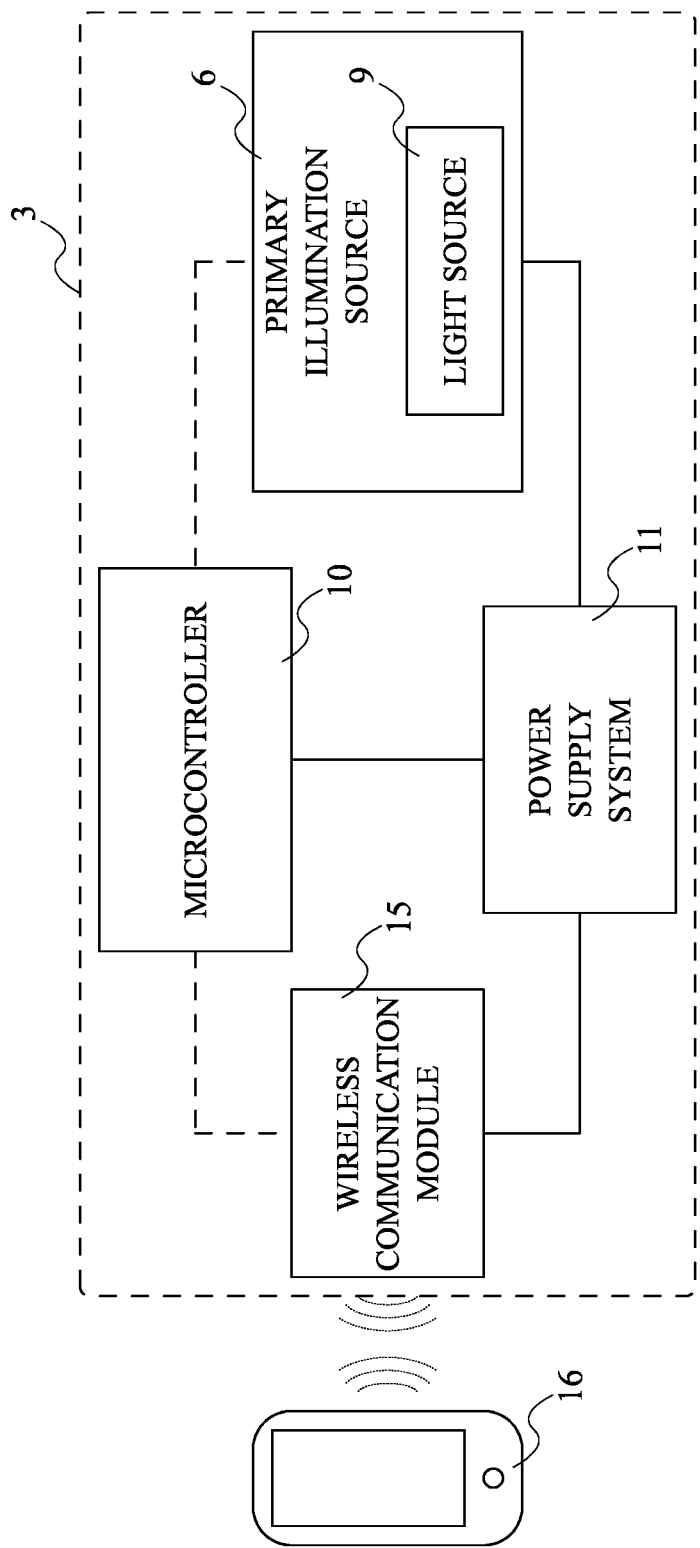
FIG. 6 is a magnified front view showing the electronic and electrical connections of the microcontroller and the power supply system to the wireless communication module and the primary illumination source.

The general configuration of the aforementioned components allows the user to enhance the holiday decoration of the wreath 23 using light decorations. As can be seen in FIG. 1 through 3, the first wire fastener 1 is terminally mounted to the support beam 3. Similarly, the second wire fastener 2 is terminally mounted to the support beam 3, opposite to the first wire fastener 1. Thus, the support beam 3 can be secured to the wire frame 22 while also being centered on the wreath 23. The primary illumination source 6, the microcontroller 10, and the power supply system 11 are laterally mounted to the support beam 3 so that the primary illumination source 6, the microcontroller 10, and the power supply system 11 is supported by the support beam 3. The primary illumination source 6 is centrally positioned along the support beam 3 so that the decoration mounted onto the primary illumination source 6 is also positioned on the center of the wreath 23. As can be seen in FIG. 6, the microcontroller 10 is electronically connected to the primary illumination source 6 to control the settings of the primary illumination source 6. Further, the power supply system 11 is electrically connected to the primary illumination source 6 and the microcontroller 10 to provide the voltage required for the operation of the primary illumination source 6 and the microcontroller 10. For example, the microcontroller 10 can help the user turn the primary illumination source 6 on or off, change colors, program lighting functions, display routines, etc. In addition, the power supply system 11 can be a low voltage DC power connection to a power plug or one or more batteries. The one or more batteries can be rechargeable or replaceable.

Figure 5:
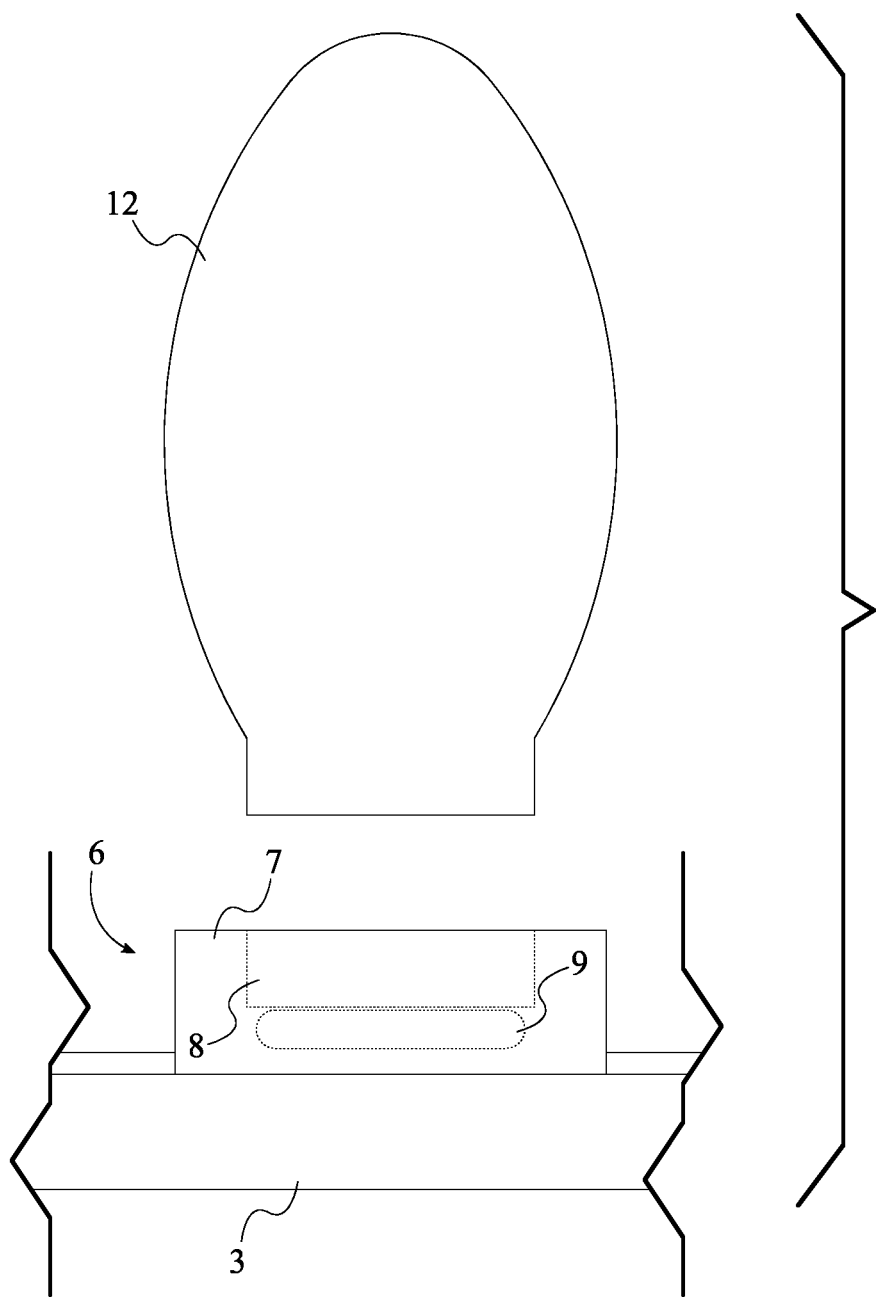
FIG. 5 is a sectional view showing the etched transparent plate removed from the primary illumination source.

The primary illumination source 6 is designed hold and illuminate the decoration on the center of the wreath 23. As can be seen in FIGS. 3 and 5, the primary illumination source 6 may comprise a source housing 7, a plate setting 8, and at least one light source 9. The source housing 7 protects the at least one light source 9. The plate setting 8 secures the light decoration to the source housing 7. The at least one light source 9 illuminates the light decoration placed on the plate setting 8. The source housing 7 is laterally connected to the support beam 3 to protect the at least one light source 9. The plate setting 8 is integrated into the source housing 7, opposite to the support beam 3, to keep the decoration above the support beam 3. The at least one light source 9 is mounted within the source housing 7. The at least one light source 9 can be Light Emitting Diode (LED) lights or other light types. In addition, the at least one light source 9 is in optical communication with the plate setting 8. Thus, the at least one light source 9 only illuminates the decoration on the plate setting 8 and not the surroundings.

As previously mentioned, the present invention is preferably designed to illuminate etched plate decorations of different designs. As can be seen in FIGS. 3 and 5, the present invention may further comprise an etched transparent plate 12 that can be made from materials like acrylic plastic. In addition, the decoration of the etched transparent plate 12 can be performed using other techniques, such as engraving. The etched transparent plate 12 is mounted into the plate setting 8 so that the etched transparent plate 12 is secured to the source housing 7 and is illuminated by the at least one light source 9. In other embodiments, the etched transparent plate 12 may be replaced with other transparent decorations that can be mounted onto the primary illumination source 6.

Figure 7:
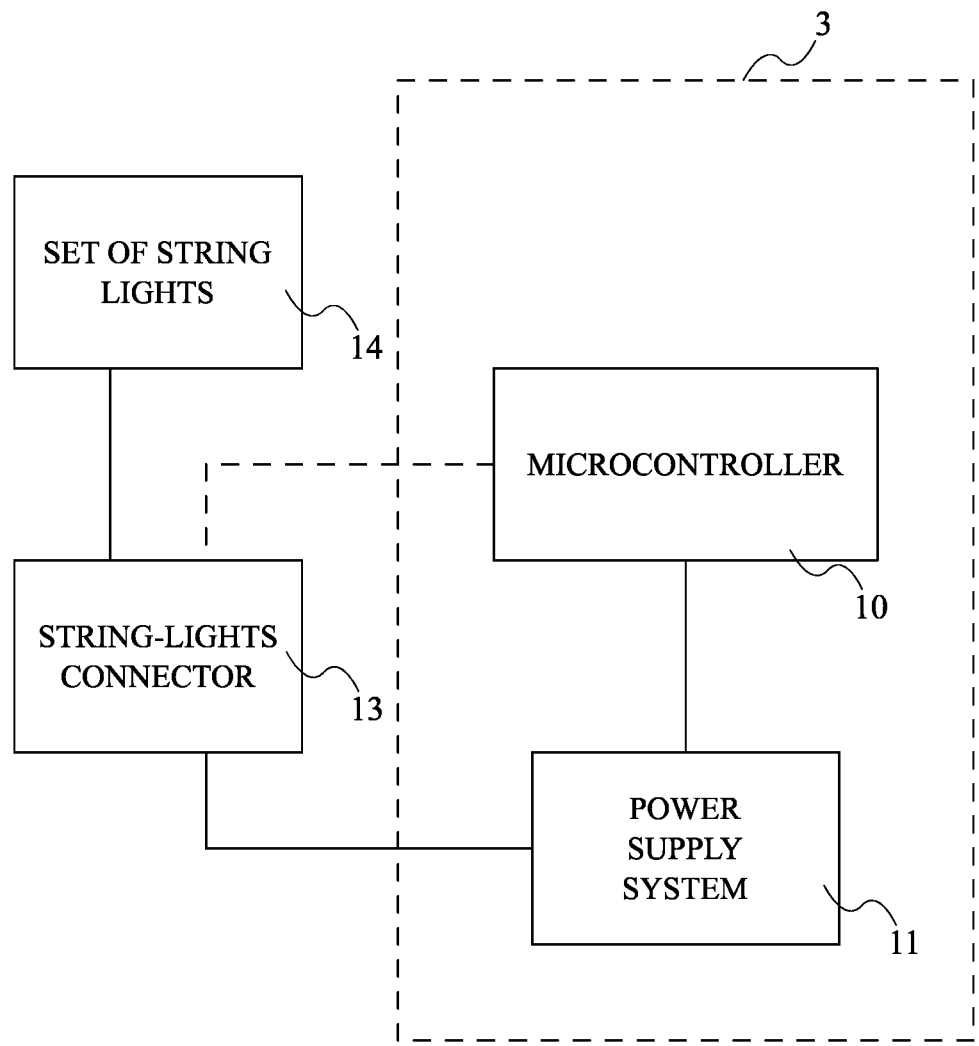
FIG. 7 is a schematic diagram showing the electronic and electrical connections of the microcontroller and the power supply system to the string-lights connector.

To enhance the decorative capabilities of the present invention, other light decorations can be connected to the microcontroller 10 so that the user can individually or collectively control the light decorations. As can be seen in FIGS. 1, 3, and 7, the present invention may further comprise at least one string-lights connector 13 and a set of string lights 14. The at least one string-lights connector 13 enables the user to connect external lights to the microcontroller 10 so that the external lights can be controlled via the microcontroller 10. The set of string lights 14 can be typical light decorations such as Christmas tree lights. The at least one string-lights connector 13 is laterally mounted to the support beam 3 to keep the wiring organized. The at least one string-lights connector 13 is electronically connected to the microcontroller 10 so that the user can configure the settings of the set of string lights 14. The at least one string-lights connector 13 is also electrically connected to the power supply system 11 to provide the voltage necessary for the operation of the set of string lights 14. Further, the set of string lights 14 is electronically and electrically connected to the at least one string-lights connector 13. Thus, the user can configure the different settings of the set of string lights 14 as well as power the set of string lights 14. In addition, the set of string lights 14 is preferably modular LED string lights where each string light is individually addressable. Thus, the user can selectively control the operation of each string light of the set of string lights 14. In other embodiments, other light decorations can be connected to the at least one string-lights connector 13. Alternatively, the other light decorations can be connected to an output connector 24 of the set of string lights 14 or the output connector 24 of the other light decorations.

Figure 8:
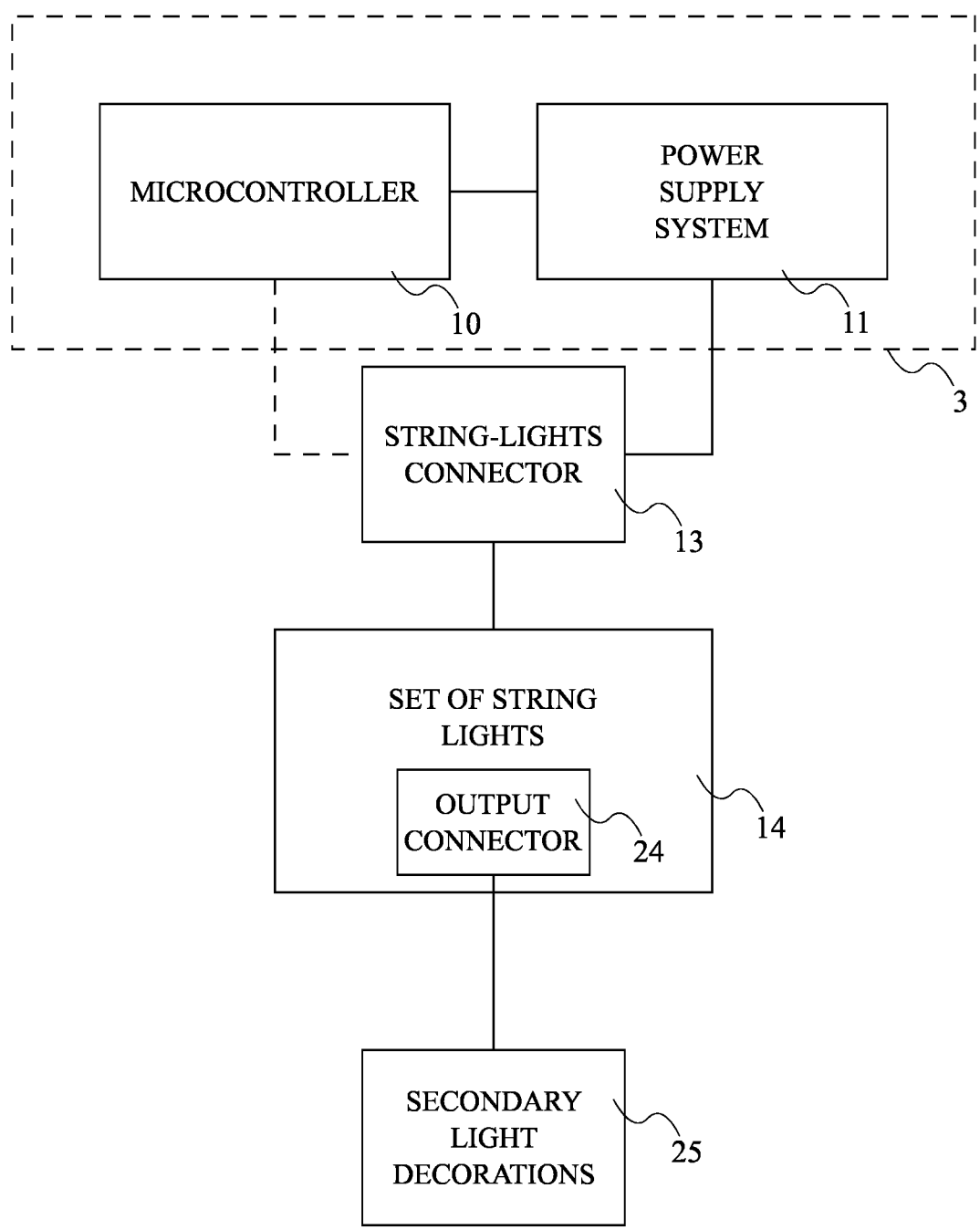
FIG. 8 is a schematic diagram showing secondary light decorations being connected to the set of string lights in series.

As can be seen in FIGS. 7 and 8, the microcontroller 10, the power supply system 11, the at least one string-lights connector 13, and the set of string lights 14 can be connected in series to transmit power and command signals from the power supply system 11 and the microcontroller 10 to the set of string lights 14 via the at least one string-lights connector 13. Additionally, when one or more secondary light decorations 25 are connected to the output connector 24, the power and command signals from the power supply system 11 and microcontroller 10 are transmitted to the one or more secondary light decorations 25. Thus, the user can connect multiple sets of string lights and other decorations in a daisy chain, passing along power and control signals to each light decoration. Further, as mentioned before, each light of the set of string lights 14 and the one or more secondary light decorations 25 connected can be individually addressed. In other embodiments, the at least one string-lights connector 13 may be modified to accommodate other illuminated decorations.

Figure 4:
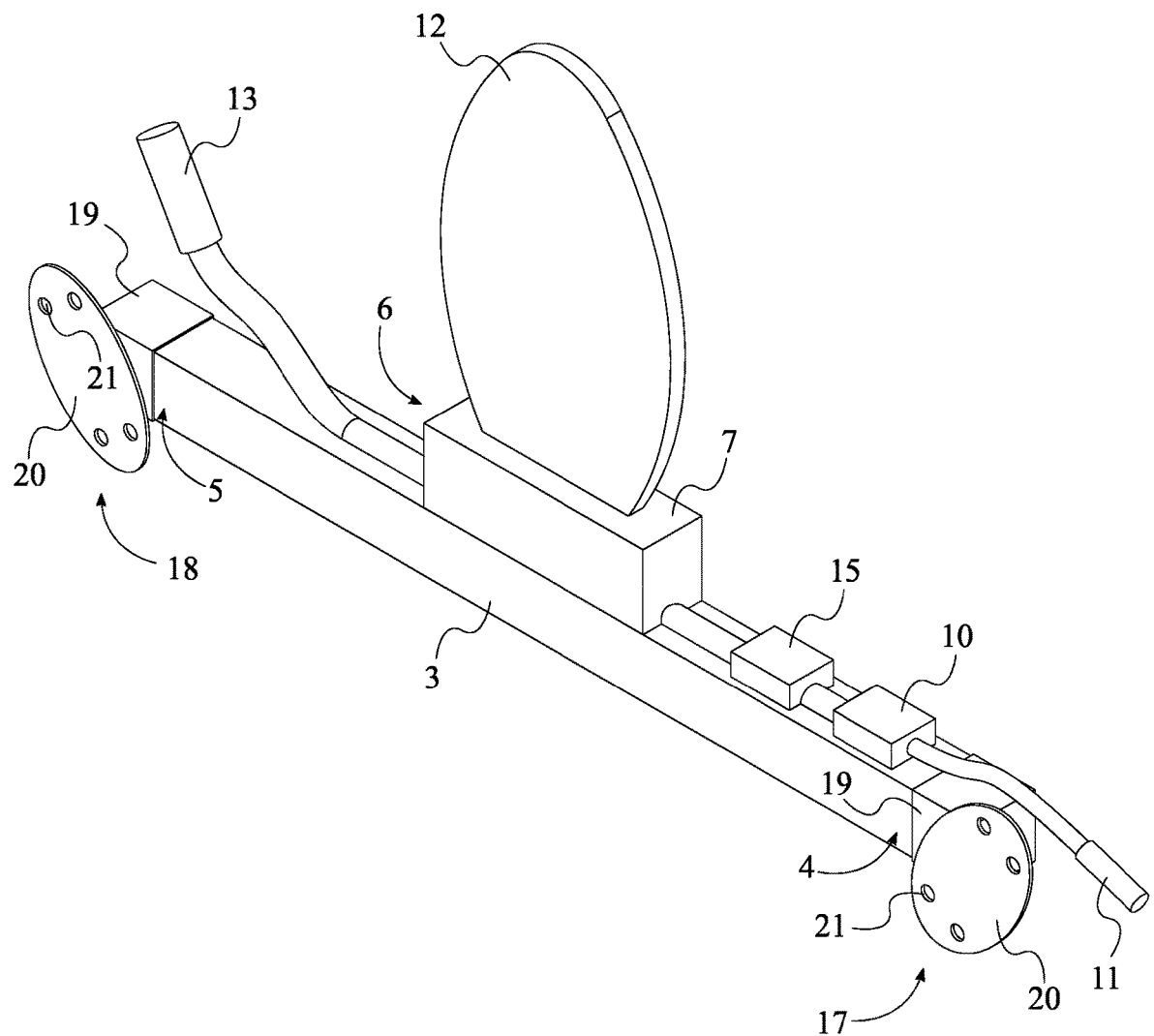
FIG. 4 is a top perspective view showing the etched transparent plate mounted onto the primary illumination source.

To enable the remote control of the different light decorations, the present invention may further comprise a wireless communication module 15. As can be seen in FIGS. 3, 4, and 6, the wireless communication module 15 can be compatible with different wireless technologies, such as infrared, Bluetooth, or Wi-Fi. The wireless communication module 15 is laterally mounted to the support beam 3 to position the wireless communication module 15 adjacent to the microcontroller 10. In addition, the wireless communication module 15 is electronically connected to the microcontroller 10 to transmit the command signals received. The wireless communication module 15 is also electrically connected to the power supply system 11 to receive the necessary voltage for operation.

In addition to the wireless communication module 15, the present invention may further comprise at least one external computing device 16 to enable the user to transmit commands to the microcontroller 10. The at least one external computing device 16 can be a typical remote control or a smartphone wirelessly connected to the wireless communication module. As can be seen in FIG. 6, the at least one external computing device 16 is positioned offset to the support beam 3 so that the user can control the microcontroller 10 from afar. The wireless communication module 15 is also communicably coupled to the at least one external computing device 16 to wirelessly transmit the commands to the microcontroller 10. The at least one external computing device 16 utilizes the same wireless technology as the wireless communication module 15 to transmit command signals.

To facilitate the adjustment of the location of the support beam 3 on the wire frame 22, the present invention may further comprise a first fastener interface 17 and a second fastener interface 18. The first fastener interface 17 and a second fastener interface 18 can be flat plates large enough to cover the width of the wire frame 22. As can be seen in FIGS. 3 and 4, the first fastener interface 17 is terminally connected to the support beam 3 to match with the position of the first wire fastener 1. Likewise, the second fastener interface 18 is terminally connected to the support beam 3, opposite to the first fastener interface 17, to match with the location of the second wire fastener 2. Further, the first wire fastener 1 is attached onto the first fastener interface 17, and the second wire fastener 2 is attached onto the second fastener interface 18. Thus, the first fastener interface 17 and the second fastener interface 18 secure the support beam 3 to the wire frame 22. In addition, the first fastener interface 17 and the second fastener interface 18 enable the user to position the present invention at any location and orientation along the wire frame 22, such as closer to the bottom of the wreath 23, angled, positioned upside down, etc.

Furthermore, the first fastener interface 17 and the second fastener interface 18 may each comprise a beam setting 19, an interface plate 20, and a plurality of interface holes 21 to enable additional adjustment. The beam setting 19 is a hollow protrusion which fits on the ends of the support beam 3. The interface plate 20 keeps the beam setting 19 flushed against the wire frame 22. The plurality of interface holes 21 enables the use of the first wire fastener 1 and the second wire fastener 2 with the interface plate 20. As can be seen in FIGS. 3 and 4, the support beam 3 may comprise a first beam end 4 and a second beam end 5. The first beam end 4 is attached into the beam setting 19 of the first fastener interface 17 to secure the first fastener interface 17 to the support beam 3. Likewise, the second beam end 5 is attached into the beam setting 19 of the second fastener interface 18 to secure the second fastener interface 18 to the support beam 3. The interface plate 20 is laterally connected to the beam setting 19 to position the interface plate 20 parallel to the support beam 3. Further, the plurality of interface holes 21 traverses through the interface plate 20, and the plurality of interface holes 21 is also distributed across the interface plate 20. The plurality of interface holes 21 includes multiple holes that enable the user to fasten the first fastener interface 17 in different orientations to perfectly center the etched transparent plate 12 on the wreath 23. Further, the first wire fastener 1 is engaged through the plurality of interface holes 21 for the first fastener interface 17. Likewise, the second wire fastener 2 is engaged through the plurality of interface holes 21 of the second fastener interface 18. Thus, the user can position and level the support beam 3 as desired by weaving the first wire fastener 1 and the second wire fastener 2 through the different holes of the plurality of interface holes 21 on the first fastener interface 17 and the second fastener interface 18, respectively.

Although the invention has been explained in relation to its preferred embodiment, it is to be understood that many other possible modifications and variations can be made without departing from the spirit and scope of the invention as hereinafter claimed.

What is claimed is:

1. A wreath decoration system comprising:
a first wire fastener;
a second wire fastener;
a support beam;
a primary illumination source;
a microcontroller;
a power supply system;
the first wire fastener being terminally mounted to the support beam;
the second wire fastener being terminally mounted to the support beam, opposite to the first wire fastener;
the primary illumination source and the microcontroller being laterally mounted to the support beam;
the primary illumination source being centrally positioned along the support beam;
the microcontroller being electronically connected to the primary illumination source; and,
the power supply system being electrically connected to the primary illumination source and the microcontroller.

2. The wreath decoration system as claimed in claim 1 comprising:
the power supply system being laterally mounted to the support beam.

3. The wreath decoration system as claimed in claim 1 comprising:
the primary illumination source comprising a source housing, a plate setting, and at least one light source;
the source housing being laterally connected to the support beam;
the plate setting being integrated into the source housing, opposite to the support beam;
the at least one light source being mounted within the source housing; and,
the at least one light source being in optical communication with the plate setting.

4. The wreath decoration system as claimed in claim 3 comprising:
an etched transparent plate; and,
the etched transparent plate being mounted into the plate setting.

5. The wreath decoration system as claimed in claim 1 comprising:
a string-lights connector;
the string-lights connector being laterally mounted to the support beam;
the string-lights connector being electronically connected to the microcontroller; and,
the string-lights connector being electrically connected to the power supply system.

6. The wreath decoration system as claimed in claim 5 comprising:
a set of string lights; and,
the set of string lights being electronically and electrically connected to the string-lights connector.

7. The wreath decoration system as claimed in claim 1 comprising:
a wireless communication module;

the wireless communication module being laterally mounted to the support beam;
the wireless communication module being electronically connected to the microcontroller; and,
the wireless communication module being electrically connected to the power supply system.

8. The wreath decoration system as claimed in claim 7 comprising:
at least one external computing device;
the at least one external computing device being positioned offset from the support beam; and,
the wireless communication module being communicably coupled to the at least one external computing device.

9. The wreath decoration system as claimed in claim 1 comprising:
a first fastener interface;
a second fastener interface;
the first fastener interface being terminally connected to the support beam;
the second fastener interface being terminally connected to the support beam, opposite to the first fastener interface;
the first wire fastener being attached onto the first fastener interface; and,
the second wire fastener being attached onto the second fastener interface.

10. The wreath decoration system as claimed in claim 9 comprising:
the first fastener interface and the second fastener interface each comprising a beam setting, an interface plate, and a plurality of interface holes;
the support beam comprising a first beam end and a second beam end;
the first beam end being attached into the beam setting of the first fastener interface;
the second beam end being attached into the beam setting of the second fastener interface;
the interface plate being laterally connected to the beam setting;
the plurality of interface holes traversing through the interface plate;
the plurality of interface holes being distributed across the interface plate;
the first wire fastener being engaged through the plurality of interface holes for the first fastener interface; and,
the second wire fastener being engaged through the plurality of interface holes of the second fastener interface.

* * * * *